US008126408B2

(12) United States Patent
Ahrony et al.

(10) Patent No.: US 8,126,408 B2
(45) Date of Patent: Feb. 28, 2012

(54) MULTI-MODE WIRELESS COMMUNICATION LINK

(75) Inventors: Ahikam Ahrony, Tel Mond (IL); Ragfi Ravid, Neve Monosson (IL); Jonathan Friedmann, Tel Aviv (IL)

(73) Assignee: Provigent Ltd (IL)

( * ) Notice: Subject to any disclaimer, the term of this patent is extended or adjusted under 35 U.S.C. 154(b) by 1073 days.

(21) Appl. No.: 12/009,728

(22) Filed: Jan. 22, 2008

(65) Prior Publication Data

US 2009/0186585 A1 Jul. 23, 2009

(51) Int. Cl.
*H03C 7/02* (2006.01)

(52) U.S. Cl. ........... 455/101; 455/17; 370/204; 370/319

(58) Field of Classification Search .................. 455/101, 455/17; 370/204, 319
See application file for complete search history.

(56) References Cited

U.S. PATENT DOCUMENTS

| | | | |
|---|---|---|---|
| 5,608,410 A | 3/1997 | Stilp et al. | |
| 5,631,896 A | 5/1997 | Kawase et al. | |
| 5,740,211 A | 4/1998 | Bedrosian | |
| 6,195,330 B1 | 2/2001 | Sawey et al. | |
| 6,611,942 B1 | 8/2003 | Battistello et al. | |
| 6,687,217 B1 | 2/2004 | Chow et al. | |
| 6,937,592 B1 | 8/2005 | Heath et al. | |
| 7,043,271 B1 | 5/2006 | Seto et al. | |
| 7,729,233 B2 * | 6/2010 | Webster et al. | 370/204 |
| 7,876,840 B2 * | 1/2011 | Tong et al. | 375/260 |
| 2004/0071104 A1 | 4/2004 | Boesel et al. | |
| 2005/0141658 A1 | 6/2005 | Tanaka et al. | |
| 2005/0174981 A1 | 8/2005 | Heath, Jr. et al. | |
| 2005/0180314 A1 * | 8/2005 | Webster et al. | 370/208 |
| 2006/0023669 A1 | 2/2006 | Yamaura et al. | |
| 2006/0079290 A1 | 4/2006 | Seto et al. | |
| 2006/0125687 A1 | 6/2006 | Greeley | |
| 2006/0135077 A1 | 6/2006 | Kim | |
| 2006/0193392 A1 | 8/2006 | Kim et al. | |
| 2006/0209979 A1 | 9/2006 | Sandell et al. | |
| 2007/0010209 A1 | 1/2007 | Nishizaki et al. | |
| 2007/0037519 A1 | 2/2007 | Kim et al. | |
| 2007/0098092 A1 | 5/2007 | Mitran | |
| 2007/0105508 A1 * | 5/2007 | Tong et al. | 455/101 |

(Continued)

OTHER PUBLICATIONS

Ericsson AB, "Capacity without ties; Mini-Link microwave transmission solution", EN/LZT 712 0117 R2, Molndal, Sweden, 2005.

(Continued)

*Primary Examiner* — Temesgh Ghebretinsae
*Assistant Examiner* — Richard Chan
(74) *Attorney, Agent, or Firm* — Sterne, Kessler, Goldstein & Fox PLLC

(57) ABSTRACT

A communication system includes first and second transmitters, which are coupled to transmit respective first and second Radio Frequency (RF) signals carrying first and second data over a wireless communication channel. The transmitters are coupled to select an operational mode from a group of operational modes and to operate in the selected operational mode. The group of the operational modes includes at least two of a protection mode, wherein the second transmitter serves as backup to the first transmitter, a spatial multiplexing mode, in which the first data is different from the second data and the first and second transmitters transmit simultaneously, and a beam-forming mode, in which the first data is identical to the second data, the second RF signal includes a phase-shifted replica of the first RF signal, and the first and second transmitters transmit simultaneously.

36 Claims, 5 Drawing Sheets

U.S. PATENT DOCUMENTS

| | | |
|---|---|---|
| 2007/0201575 A1 | 8/2007 | Ariyavisitakul et al. |
| 2007/0207730 A1 | 9/2007 | Nguyen et al. |
| 2008/0130726 A1 | 6/2008 | Sofer et al. |
| 2009/0049361 A1 | 2/2009 | Koren et al. |

OTHER PUBLICATIONS

Alamouti, "A Simple Transmit Diversity Technique for Wireless Communication", IEEE Journal on Select Areas in Communications, vol. 16, No. 8, pp. 1451-1458, Oct. 1998.

Tarokh et al., "Space-Time Codes for High Data Rate Wireless Communication; Performance Analysis and Code Construction", IEEE Transactions on Information Theory (44:2), pp. 744-765, Mar. 1998.

International Application PCT/IL09/00020 Search Report dated Apr. 21, 2009.

U.S. Appl. No. 12/355,823, filed Jan. 19, 2009, Ravid et al.

International Application PCT/IL2008/001620 Search Report dated May 7, 2009.

* cited by examiner

MULTI-MODE WIRELESS COMMUNICATION LINK

FIELD OF THE INVENTION

The present invention relates generally to wireless communication links, and particularly to methods and systems for operating wireless links in multiple operational modes.

BACKGROUND OF THE INVENTION

Some communication systems transmit and receive data over redundant communication links, in order to provide protection against equipment failures and adverse channel conditions. For example, Ericsson LM (Kista, Sweden) offers a microwave link product line called MINI-LINK, which supports such protected configurations.

U.S. Pat. No. 6,611,942, whose disclosure is incorporated herein by reference, describes a method of protecting the transmission of cells in a telecommunication system. On the transmitter side, two identical flows of cells are transmitted on two distinct physical links. Cells serving as markers, and thus delimiting blocks of cells or sets of blocks of cells, are inserted regularly into each of the flows at the transmitter. On the receiver side, the two flows of cells are received and the block or group of blocks from the flow having the fewer transmission errors is selected.

U.S. Pat. No. 5,631,896, whose disclosure is incorporated herein by reference, describes a path switching method without bit loss. The same digital line signals on a working path and on a protection path are continuously monitored independently for bit errors. If a bit error occurs in the working path and no bit error occurs in the protection path, a switching trigger is produced and a switching operation from the working path to the protection path is performed on a data block basis. Only correct data are transferred to downstream apparatuses. The method uses data blocks of one frame length with an indicator for bit error checking placed at the beginning or top of the block.

Other communication systems, commonly referred to as Multiple-Input Multiple-Output (MIMO) systems, transmit and receive simultaneously using multiple transmit and receive antennas. Some MIMO techniques are used for providing spatial multiplexing of signals. For example, U.S. Pat. No. 6,937,592, whose disclosure is incorporated herein by reference, describes a wireless communication system that adapts its mode of operation between spatial multiplexing and non-spatial multiplexing in response to transmission-specific variables. In an embodiment, a subscriber unit includes mode determination logic that is in communication with the subscriber unit and with a base transceiver station. The mode determination logic determines, in response to a received signal, if a subscriber data stream should be transmitted between the base transceiver station and the subscriber unit utilizing spatial multiplexing or non-spatial multiplexing.

U.S. Patent Application Publication 2007/0010209, whose disclosure is incorporated herein by reference, describes a control method used in a communication system that includes multiple transmission and reception antennas. When a reception side detects a state change between a normal state and an abnormal state in any reception section among a plurality of reception sections, the reception side calculates a number equal to or less than the number of normal reception sections, and transmits information of the calculated number to the transmission side. The transmission side matches a number of transmission sections that are to be operated accordingly.

Other communication systems transmit phase-shifted replicas of a transmitted signal from multiple antennas to produce a directional, high-gain transmission. These techniques are often referred to as Beam Forming (BF) techniques.

SUMMARY OF THE INVENTION

Embodiments of the present invention provide a communication system including first and second transmitters, which are coupled to transmit respective first and second Radio Frequency (RF) signals carrying first and second data over a wireless communication channel, to select an operational mode from a group of operational modes and to operate in the selected operational mode, wherein the group of the operational modes includes at least two of:

a protection mode, wherein the second transmitter serves as backup to the first transmitter;

a spatial multiplexing mode, in which the first data is different from the second data, and the first and second transmitters transmit simultaneously; and a beam-forming mode, in which the first data is identical to the second data, the second RF signal includes a phase-shifted replica of the first RF signal, and the first and second transmitters transmit simultaneously.

In some embodiments, the system includes at least one controller, which is configured to evaluate a condition of the system and, responsively to the evaluated condition, to select the operational mode from the group of the operational modes and to cause the first and second transmitters to operate in the selected operational mode.

In a disclosed embodiment, the system further includes first and second receivers, which are coupled to receive the first and second RF signals and to produce first and second received signals, and an output module, which is controlled by the at least one controller and is coupled to process the first and second received signals so as to decode at least part of the first and second data in accordance with the selected operational mode.

In an embodiment, the at least one controller is configured to cause the output module to decode the at least part of the first and second data from one of the first and second received signals when the system is operating in the protection mode, and to jointly decode the first and second data from the first and second received signals when the system is operating in one of the spatial multiplexing and the beam-forming modes.

In another embodiment, when the system is operating in the protection mode, both the first receiver and the second receiver are configured to receive the first RF signal, and the second receiver serves as backup to the first receiver. In yet another embodiment, when the system is operating in the protection mode, the second receiver is inactive, and the at least one controller is configured to activate the second receiver responsively to a failure in the first receiver. In an alternative embodiment, when the system is operating in the protection mode, both the first receiver and the second receiver are active and the output module decodes the first data from the first receiver, and the at least one controller is configured to cause the output module to start decoding the first data from the second receiver responsively to a failure in the first receiver.

In still another embodiment, when the system is operating in the beam-forming mode, the output module is coupled to jointly decode the first and second data irrespective of a phase offset between the first and second RF signals. In an embodiment, the first and second transmitters respectively include first and second transmit antennas that are positioned at a first antenna separation with respect to one another, the first and second receivers respectively include first and second receive antennas that are positioned at a second antenna separation with respect to one another, and at least one of the first and second antenna separations is chosen such that joint decoding of the first and second data is insensitive to the phase offset.

In a disclosed embodiment, the output module is coupled to multiply the first and second received signals by respective, orthogonal first and second phase-rotating signals before decoding the first and second data.

In another embodiment, the at least one controller includes a transmitter controller for controlling the transmitters and a receiver controller for controlling the receivers and the output module, and the transmitter and receiver controllers are configured to coordinate the selected operational mode with one another. In yet another embodiment, when the system is operating in the beam-forming operational mode, the receiver controller is configured to perform a measurement on the first and second received signals, and the transmitter controller is configured to modify a phase offset between the first and second RF signals responsively to the measurement.

In still another embodiment, the at least one controller includes a transmitter controller for controlling the transmitters and a receiver controller for controlling the receivers and the output module, and the receiver controller is configured to select the operational mode irrespective of the transmitter controller.

In some embodiments, the at least one controller is configured to alternate between the operational modes without data loss. In an embodiment, the condition depends on at least one parameter selected from a group of parameters consisting of a characteristic of a channel between one of the transmitters and one of the receivers, a reception quality at one of the receivers, a failure indication and a characteristic of one of the first and second data. In another embodiment, the condition depends on at least one parameter selected from a group of parameters consisting of a modem parameter in one of the transmitters, a modem parameter in one of the receivers, a Signal to Noise Ratio (SNR) of one of the received signals, a dispersion characteristic of a channel between one of the transmitters and one of the receivers, and an error rate in one of the receivers. In some embodiments, the at least one controller is configured to select the protection operational mode in order to enable performing a maintenance operation on the system.

In some embodiment, the first and second transmitters are coupled to produce the first and second RF signals using respective first and second Local Oscillator (LO) signals that are phase-synchronized with one another. In an alternative embodiment, the first and second transmitters are coupled to produce the first and second RF signals using respective first and second Local Oscillator (LO) signals that are not phase-synchronized with one another. In an embodiment, the first and second transmitters transmit the first and second RF signals at respective first and second frequencies having first and second phases, and one of the first and second transmitters is coupled to track a frequency and a phase of the other of the first and second transmitters.

There is additionally provided, in accordance with an embodiment of the present invention, a method for communication, including:

transmitting first and second Radio Frequency (RF) signals carrying first and second data over a wireless communication channel by respective first and second transmitters; and selecting an operational mode from a group of operational modes and causing the first and second transmitters to operate in the selected operational mode, wherein the group of the operation modes includes at least two of:

a protection mode, wherein the second transmitter serves as backup to the first transmitter;

a spatial multiplexing mode, in which the first data is different from the second data, and the first and second transmitters transmit simultaneously; and a beam-forming mode, in which the first data is identical to the second data, the second RF signal includes a phase-shifted replica of the first RF signal, and the first and second transmitters transmit simultaneously.

The present invention will be more fully understood from the following detailed description of the embodiments thereof, taken together with the drawings in which:

DETAILED DESCRIPTION OF EMBODIMENTS

Overview

Wireless communication links are often operated under a variety of operating conditions and performance requirements, which may change over time. For example, changing weather conditions may vary the link attenuation, equipment failures may affect the link performance and functionality, and the link may be required to provide varying throughputs.

Different link configurations, such as spatial multiplexing, beam-forming and backup protection, may be preferable under different sets of conditions and requirements. For example, a spatial multiplexing configuration is characterized by high throughput, a beam-forming configuration is preferable for providing high system gain when the link attenuation is high, and a protection configuration may be used for increasing reliability.

However, since the link conditions and requirements vary over time, optimal performance cannot be achieved by any single configuration. A certain configuration may provide optimal performance in a particular scenario, but may be inferior in other scenarios.

Embodiments of the present invention provide multi-mode communication links, which change their mode of operation automatically to match the current conditions and/or requirements. In some embodiments that are described hereinbelow, a multi-mode communication link comprises multiple transmitters and multiple receivers. The transmitters and receivers can be configured to operate in one of several possible operational modes, such as a protection configuration, a spatial multiplexing configuration and a beam-forming configuration.

The link comprises a system controller, which evaluates a condition and sets the different link components to operate in one of the operational modes. The condition may be based on various parameters, such as the conditions of the different channels between the transmitters and the receivers, the quality of reception at the receiver, indications of equipment failures in the transmitters and/or receivers, and characteristics of the data intended for transmission. The controller may apply different policies for selecting the appropriate operational mode for a given set of conditions and requirements. Several examples are described herein.

The multi-mode communication links described herein adapt their configuration to match the current conditions, and can therefore achieve optimal performance under a wide range of time-varying conditions and requirements. Moreover, the methods described herein enable relaxing and downsizing some of the link specifications, which may provide a considerable reduction of cost, size and power consumption. Automatic multi-mode operation is also advantageous from a logistical point of view, enabling a single type of system to be used in a variety of installations and environments, without a need for site-specific optimization.

System Description

Figure 1:
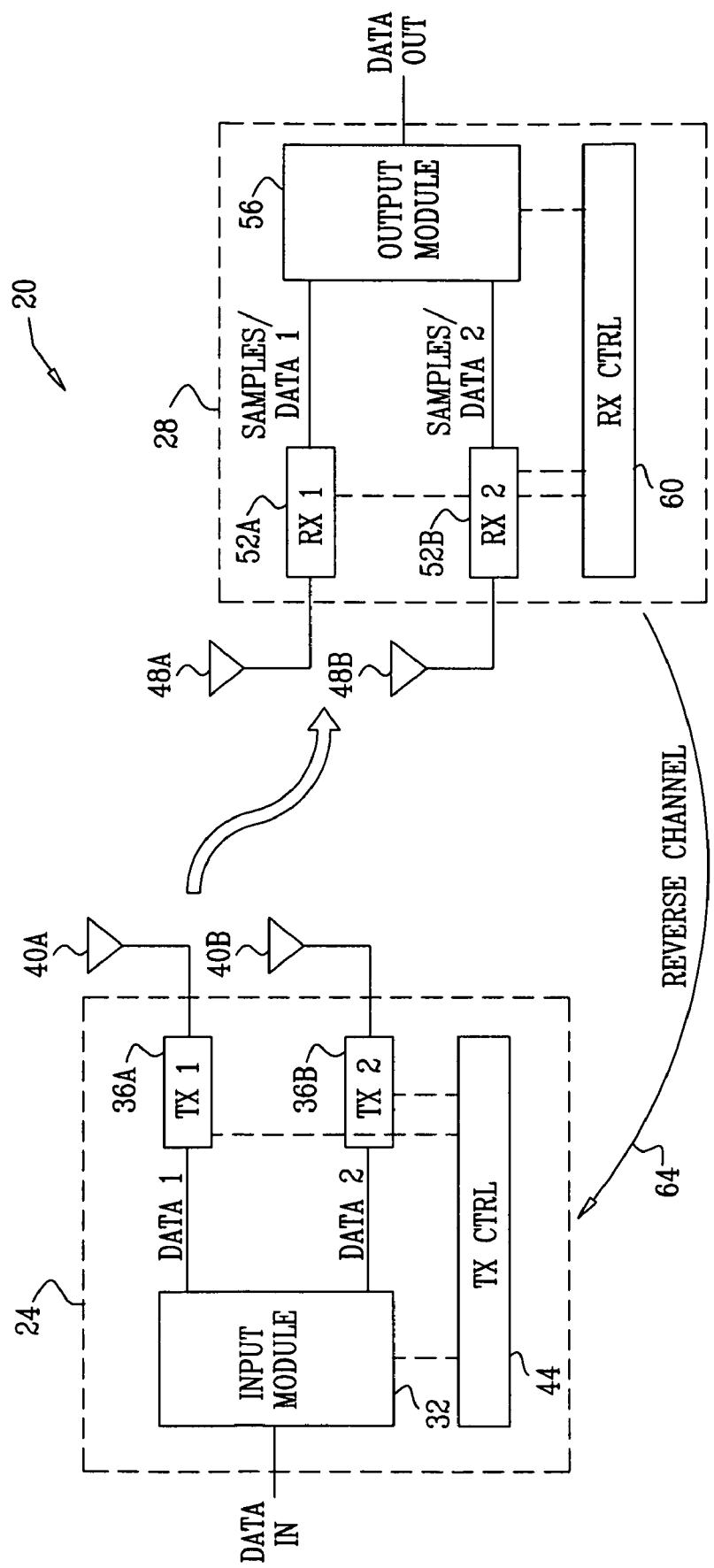
FIG. 1 is a block diagram that schematically illustrates a multi-mode wireless communication link, in accordance with an embodiment of the present invention.

FIG. 1 is a block diagram that schematically illustrates a multi-mode wireless communication link 20, in accordance with an embodiment of the present invention. Link 20 comprises a dual transmitter (TX) 24, which communicates with a dual receiver (RX) 28 over a wireless channel. Link 20 may comprise a microwave or millimeter-wave link, or any other suitable type of wireless communication link.

Dual transmitter 24 comprises an input module, which accepts input data and produces two data streams denoted DATA1 and DATA2. The dual transmitter comprises transmitters 36A and 36B, which respectively process data streams DATA1 and DATA2 to produce Radio Frequency (RF) signals. The RF signals are transmitted via respective transmit antennas 40A and 40B.

Typically, each of the two transmitters encodes its respective data stream using a suitable Error Correction Code (ECC), modulates the encoded data using a suitable modulation scheme, converts the modulated digital signal to an analog baseband signal, up-converts the baseband signal to RF, amplifies the RF signal and transmits it via the transmit antenna. The transmitters often perform additional functions such as digital and/or analog filtering, power control and other functions. Dual transmitter 24 further comprises a TX controller 44, which configures and controls the different transmitter elements, and in particular module 32 and transmitters 36A and 36B.

The RF signals transmitted by dual transmitter 24 are received by dual receiver 28. The dual receiver comprises receive antennas 48A and 48B, which receive the signals transmitted from transmit antennas 40A and 40B. Note that the correspondence between transmit and receive antennas is not fixed, and that a certain receive antenna does not necessarily receive the signal from any single transmit antenna. As will be explained in detail below, in some operational modes of link 20 each receive antenna may receive the signals transmitted by both transmit antennas, whereas in other modes each receive antenna receives only the signal transmitted by one of the transmit antennas.

In a typical deployment of link 20, the transmit and receive antennas are directional, i.e., have directional beam patterns whose main lobes are directed toward the opposite side of the link. The link geometry is typically set so that both receive antennas are covered by the main lobes of both transmit antennas, and vice versa.

In some embodiments, transmitters 36A and 36B transmit on different frequencies. Additionally or alternatively, transmit antennas 40A and 40B may transmit at different polarizations. Further additionally or alternatively, the transmit antennas and/or the receive antennas may be mounted at a certain offset with respect to one another, to provide spatial diversity.

The RF signals received by antennas 48A and 48B are processed by receivers 52A and 52B, respectively. Each receiver typically down-converts the RF signal to baseband and then converts the baseband signal to a stream of digital samples. The two sample streams produced by receivers 52A and 52B are provided to an output module 56. The output module processes the sample streams and reconstructs the data carried by the two received signals. The dual receiver further comprises an RX controller 60, which configures and controls the different receiver elements, and in particular module 56 and receivers 52A and 52B.

TX controller 44 and/or RX controller 60 carry out the multi-mode operation methods in link 20. Different functions can be divided between the two controllers in different ways, as desired. Thus, the TX and RX controllers are collectively viewed as a system controller, which carries out the methods described herein. The TX and RX controllers may exchange data, coordinate operational mode changes and otherwise communicate with one another. The TX controller may send data to the RX controller using transmitter 36A and/or 36B. In some embodiments, link 20 comprises a reverse channel 64, using which the RX controller can send data to the TX controller. Typically, controllers 44 and 60 comprise general-purpose processors, which are programmed in software to carry out the functions described herein. The software may be downloaded to the processors in electronic form, such as over link 20, or it may alternatively be supplied to the processor on tangible media.

Each transmitter and receiver typically comprises an analog section, which carries out the analog processing functions, and a modem, which carries out the digital processing functions of the transmitter or receiver. The analog sections may be implemented, for example, using RF Integrated Circuits (RFIC), discrete components or a combination thereof. The modems may be implemented in hardware, such as using Application-Specific Integrated Circuits (ASIC) or Field-Programmable Gate Arrays (FPGA), using software or using a combination of hardware and software elements.

Although the embodiments described herein mainly address configurations of two transmitters and two receivers, these configurations were chosen purely for the sake of conceptual clarity. In alternative embodiments, link 20 may comprise any number of transmitters and/or receivers.

Multi-Mode Link Operation

Embodiments of the present invention provide methods and systems for operating the multiple transmitters and receivers of link 20 in three different operational modes, namely a protection mode, a spatial multiplexing mode and a beam forming mode. Each mode provides certain performance advantages under certain circumstances. The methods described herein alternate among the three modes, or a subset of the modes, depending on various conditions. The description that follows first describes each of the modes. Several conditions and events that may be used to trigger mode changes are described further below.

Figure 2:
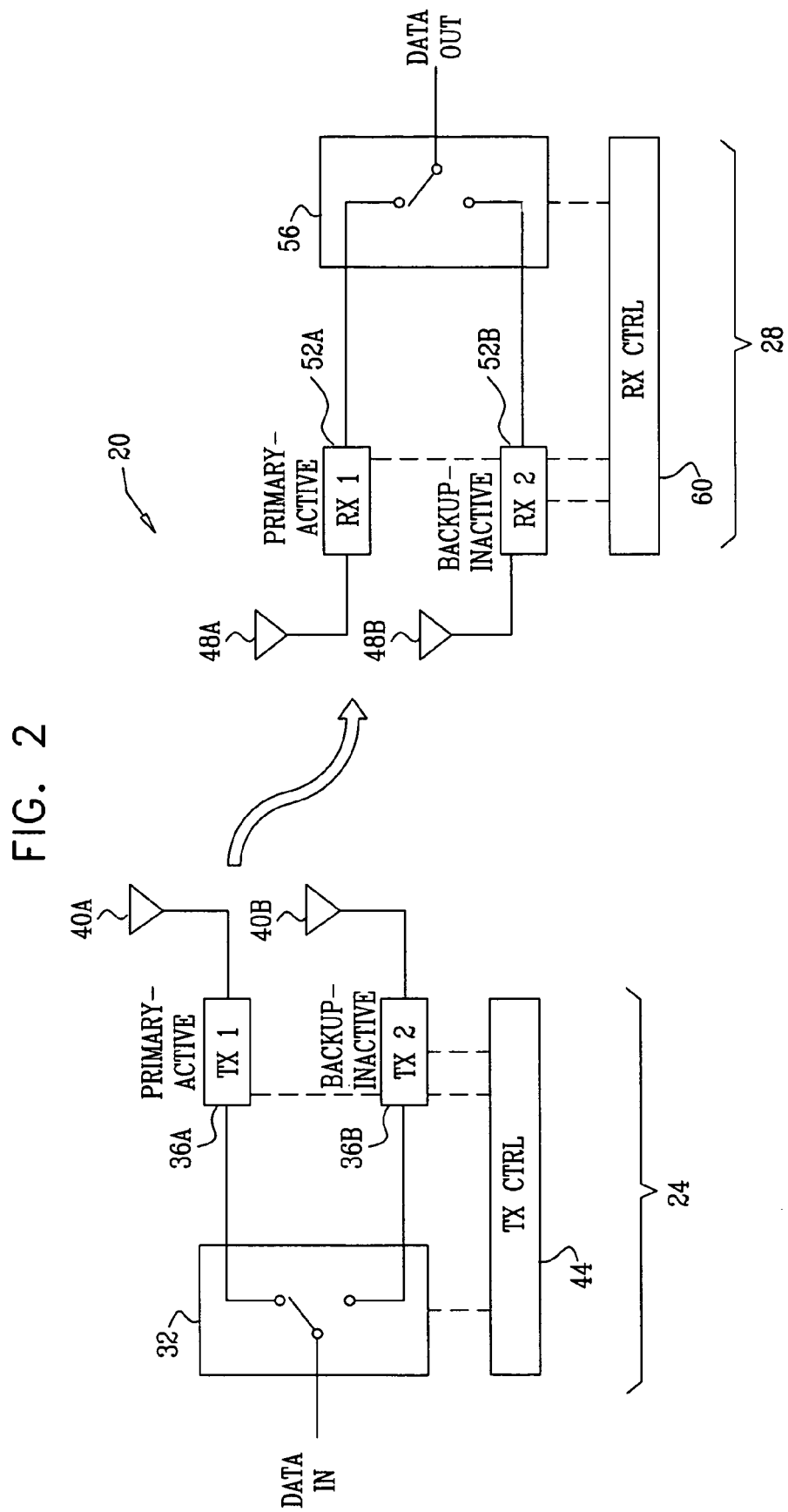
FIGS. 2-4 are block diagrams that schematically illustrate operation of a multi-mode wireless communication link in different operational modes, in accordance with an embodiment of the present invention.
Figure 3:
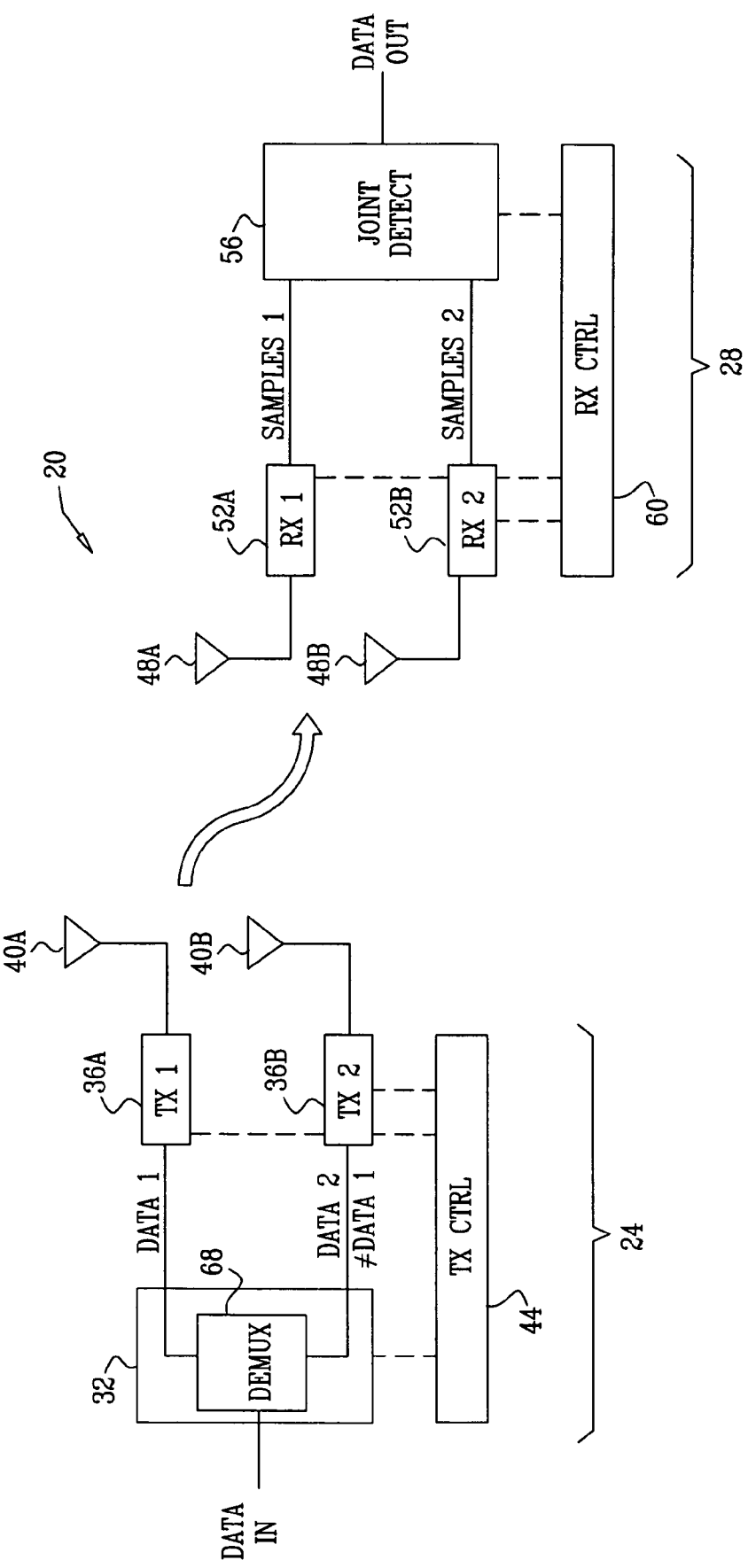
Figure 4:
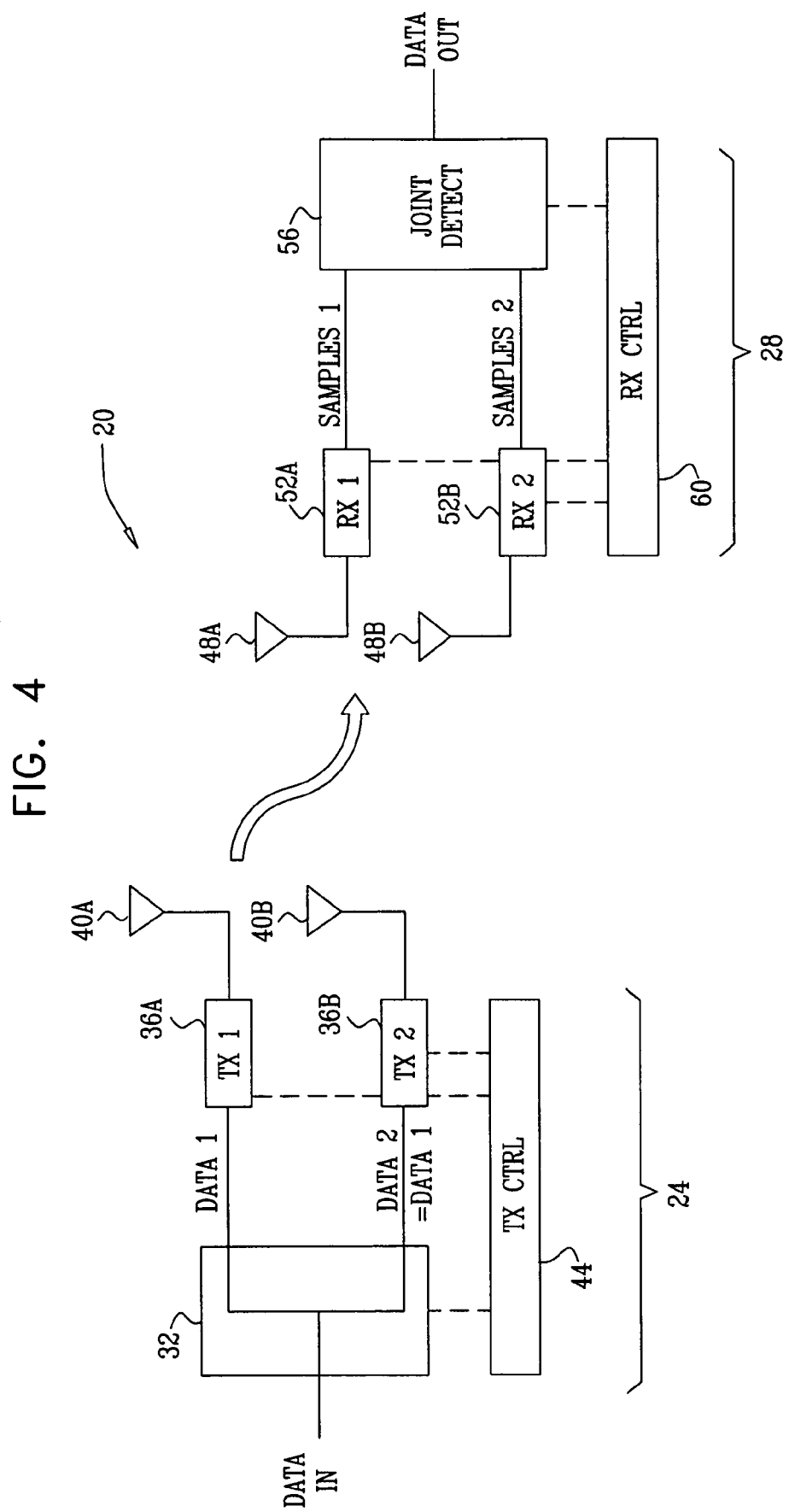

FIGS. 2-4 are block diagrams that schematically illustrate configuration and operation of link 20 in the different operational modes, in accordance with an embodiment of the present invention. FIG. 2 shows the protection mode, FIG. 3 shows the spatial multiplexing mode, and FIG. 4 shows the beam forming mode. Note that FIGS. 2-4 address different modes of the multi-mode link shown in FIG. 1, which differ from one another in the way the TX and RX controllers control and configure the input module, the transmitters, the receivers and the output module.

FIG. 2 shows the protection mode of link 20. In this mode, transmitter 36A serves as the primary transmitter and transmitter 36B serves as backup. In the dual receiver, receiver 52A serves as the primary receiver and receiver 52B serves as backup. By default, the backup link (i.e., the link comprising the backup transmitter and receiver) is deactivated and is not used for transferring data. When the primary link (i.e., the link comprising the primary transmitter and receiver) fails, the TX and RX controllers deactivate the primary transmitter and receiver and activate the backup transmitter and receiver. The primary link may fail, for example, because of a failure in the primary transmitter or in the primary receiver, or because the channel conditions of the primary link become unacceptable.

Note that the transmitters and receivers usually alternate the active and backup roles they serve. For example, after the primary link fails, the link that was previously regarded as backup becomes the primary link. If this link fails (and provided the other link was repaired), it will be replaced by the previous primary link, which currently serves as backup.

In some embodiments, when operating in the protection mode, TX controller 44 configures input module 32 to direct the input data to the primary transmitter, activates the primary transmitter and deactivates the backup transmitter. RX controller 60 configures output module 56 to extract the output data from the primary receiver, activates the primary receiver and deactivates the backup receiver. In some embodiments, the primary transmitter and both receivers are active. Both receivers receive the signal transmitted by the primary transmitter, and thus protect one another against failure in a hitless manner. If the primary transmitter fails, the TX controller activates the backup transmitter to replace it. (Although not directly related to protection, one of the transmitters and/or one of the receivers may be deactivated for other reasons, such as during initial acquisition and setup of the link that may be carried out by a single transmitter-receiver pair, or during maintenance such as repair or upgrade.)

Some additional aspects of operating protected communication links are described in U.S. patent application Ser. No. 11/634,781, entitled "Data Rate Coordination in Protected Variable-Rate Links," filed Dec. 5, 2006, and in U.S. patent application Ser. No. 11/891,754, entitled "Protected Communication Link with Improved Protection Indication," filed Aug. 13, 2007, whose disclosures are incorporated herein by reference.

FIG. 3 shows the operation of the spatial multiplexing mode of link 20. In this operational mode, transmitters 36A and 36B are both active and transmit different data. Input module 32 accepts the input data and splits it into the two data streams DATA1 and DATA2, DATA1≠DATA2, such as using a de-multiplexer 68. Thus, the RF signals transmitted by transmitters 36A and 36B are typically different and unrelated. The two RF signals may be transmitted on different frequencies and/or at different polarizations.

In the dual receiver, receivers 52A and 52B are both active in this mode. As explained above, because of the link geometry, each of the receive antennas receives the two RF signals transmitted by both transmit antennas 40A and 40B. Thus, each of receivers 52A and 52B processes components of the two signals that carry DATA1 and DATA2. The signal components are not identical, however, since they travel through different wireless channels.

Output module 56 accepts the received signals from receivers 52A and 52B, and performs joint detection of DATA1 and DATA2. Any suitable joint detection method can be used for this purpose. For example, the output module may apply Maximum Ratio Combining (MRC). Alternatively, the system may use a Space-Time Trellis Code (STTC). STTCs are described, for example, by Tarokh et al., in "Space-Time Codes for High Data Rate Wireless Communication: Performance Analysis and Code Construction," IEEE Transactions on Information Theory, (44:2), March 1998, pages 744-765, which is incorporated herein by reference.

Further alternatively, a Space-Time Block Code (STBC) can be used. STBCs are described, for example, by Alamouti in "A Simple Transmit Diversity Technique for Wireless Communication," IEEE Journal on Select Areas in Communications, volume 16, number 8, October 1998, pages 1451-1458, which is incorporated herein by reference. Alternatively, module 56 may use any other suitable joint detection method. Module 56 reconstructs the original input data sequence from DATA1 and DATA2, and provides the data sequence as output.

FIG. 4 shows the operation of the beam forming mode of link 20. In this mode, both transmitters transmit the same data. The two RF signals transmitted by the two transmit antennas are phase-shifted replicas of one another, and the relative phase between the two signals is selected to form a directional beam that is directed toward receiver 28.

The controlled phase shift between the two RF signals is typically achieved by locking a Local Oscillator (LO) of one transmitter to an LO of the other. Alternatively, the LOs of transmitters 36A and 36B are locked on a common reference clock. Further alternatively, the LOs in the two transmitters may be derived from different reference clocks, in which case one of the transmitters tracks and corrects its frequency to match the frequency and phase of the other using a correction loop. The correction loop is typically digital, although analog implementations are also feasible.

The dual receiver may use different configurations for receiving the directional signal. In some embodiments, the receiver activates both receivers 52A and 52B, and output module 56 performs joint detection on the two sequences of received samples. For example, the output module may perform Maximum Ratio Combining (MRC), as is known in the art.

Characteristics of the Different Operational Modes

The three operational modes described above have different characteristics, advantages and limitations, and may provide performance benefits under different circumstances. For example, the spatial multiplexing mode may be preferable for providing high throughput, because the two links transmit different data in parallel. The beam forming mode, on the other hand, provides superior link budget and is preferable in adverse channel conditions, such as during rainy periods. The protection mode is naturally preferred when reliability is a major consideration. The protection mode can also be used for increasing the reliability (e.g., the Mean Time Between Failures—MTBF) of the link, since only one transmitter is active at any given time.

The system controller (i.e., TX controller 44 and/or RX controller 60) evaluates a certain condition, and selects the appropriate operational mode of link 20 based on this condition. The controller may apply various criteria, logic or policies for alternating among the different modes, in response to various conditions. The condition may be based on parameters such as the conditions of the different wireless communication channels between the transmitters and the receivers, the quality of reception at the receiver, indications of equipment failures in the transmitters and/or receivers, characteristics of the data intended for transmission (e.g., desired throughput), and/or on any other suitable parameter.

The condition may also depend on factors such as a modem parameter in one or the transmitters or receivers, a Signal to Noise Ratio (SNR) in one or both of the receivers, dispersion characteristics of the channels between the transmitters and receivers as measured by one or both receivers, and an error rate as measured or estimated by one or both of the receivers.

For example, the controller may operate the link in the protection mode by default, so as to enable the link to react to equipment failures and increase its MTBF. When channel conditions drop below a certain threshold (e.g., in heavy rain), the controller may switch the link to operate in the beam forming mode. In this mode, the link is less resilient to failures, but is able to maintain communication even when the channel attenuation is high. When channel conditions improve, the controller may switch the link back to the protection mode.

As another example, the link may initially operate in the protection mode. When transmitter 24 needs to transmit an exceedingly high volume of traffic, the controller may switch to the spatial multiplexing mode and gain additional throughput. When the required throughput returns to normal, the controller may switch back to the protection mode.

As yet another example, the controller may initially operate the link in the spatial multiplexing mode, so as to provide a high nominal throughput. When equipment failure occurs, the controller switches to the protection mode. The link thus continues to operate in spite of the failure, but at a lower throughput.

Additionally or alternatively, the controller may apply any other suitable condition and any other suitable logic or criteria for selecting the appropriate operational mode based on the evaluated condition. The controller may evaluate multiple conditions, such as different conditions for transitioning to and/or from different modes. In particular, the conditions may define a hysteresis feature, in which the condition for transitioning from one mode to another is different from the condition for transitioning in the opposite direction.

The multi-mode operation of link 20 enables the link to provide optimal performance under a wide variety of changing conditions and requirements. Moreover, the multi-mode capability enables downsizing the link specifications, which provides a considerable reduction of cost, size and power consumption. For example, microwave links are usually designed to meet a specified maximum outage probability. The outage periods are usually caused by rain. Since link 20 can operate in the beam forming mode, the link can be designed to meet the desired performance level assuming this mode, which may enable a reduction of up to 9 dB in transmitter power. When conditions are good, the link can operate in the protection mode or in the spatial multiplexing mode and provide enhanced reliability and/or throughput.

In some embodiments, the TX and RX controllers coordinate the transition from one operational mode to another so that the transition is hitless, i.e., no data is lost in the transition. For example, the data may be transmitted in frames, which are numbered or are otherwise identifiable by the TX and RX controllers. When initiating a mode change, the TX and RX controllers coordinate a certain frame in which the change is to occur, and perform the transition in the desired frame in both the transmitter and the receiver. In other embodiments, hitless operation can be carried out without coordination between the TX and RX controllers.

In some embodiments, the mode changes can be carried out only at receiver 28, without transmitter 24 being aware of the mode that is currently selected. In these embodiments, coordination of mode changes using reverse channel 64, if one exists, is not needed. For example, both transmitters may transmit the same data, and the two receivers may alternate between the beam-forming and protection modes, without involving the transmitters.

Figure 5:
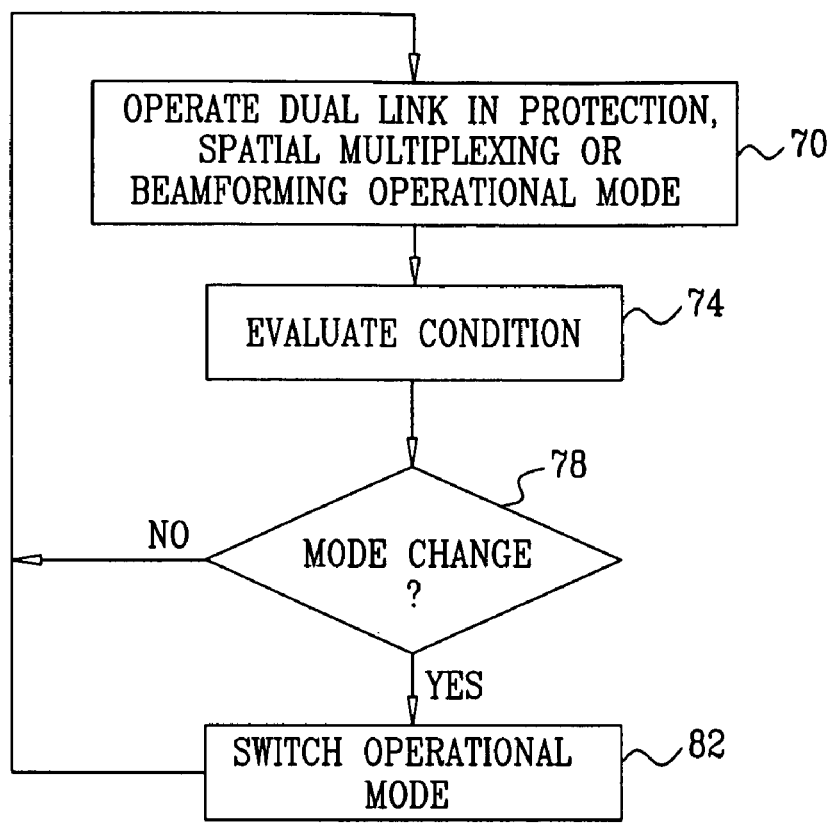
FIG. 5 is a flow chart that schematically illustrates a method for operating a multi-mode wireless communication link, in accordance with an embodiment of the present invention.

FIG. 5 is a flow chart that schematically illustrates a method for operating a multi-mode wireless communication link, in accordance with an embodiment of the present invention. The method begins with link 20 operating in one of the operational modes described above, at an operation step 70. The system controller evaluates one or more predefined mode change conditions, at a condition evaluation step 74. Based on the evaluated conditions, the controller checks whether to change the operational mode of the link, at a checking step 78.

If the evaluated conditions indicate that a mode change should be performed, the controller changes the mode accordingly, at a mode changing step 82. The method then loops back to step 70 above and link 20 begins to operate in the newly-selected operational mode.

Otherwise, i.e., if the controller concludes at step 78 that the current operational mode is to be maintained, the method loops back to step 70 above without performing step 82, and the link continues to operate without changing its operational mode.

Phase Offset Coordination in the Beam-Forming Mode

When operating in the beam-forming mode, the system gain (i.e., the link budget improvement in comparison to using a single antenna) depends on several link parameters, such as on the communication range (the distance between the transmitter and receiver), the link frequency, the distance between the two transmit antennas and the distance between the two receive antennas.

Figure 6:
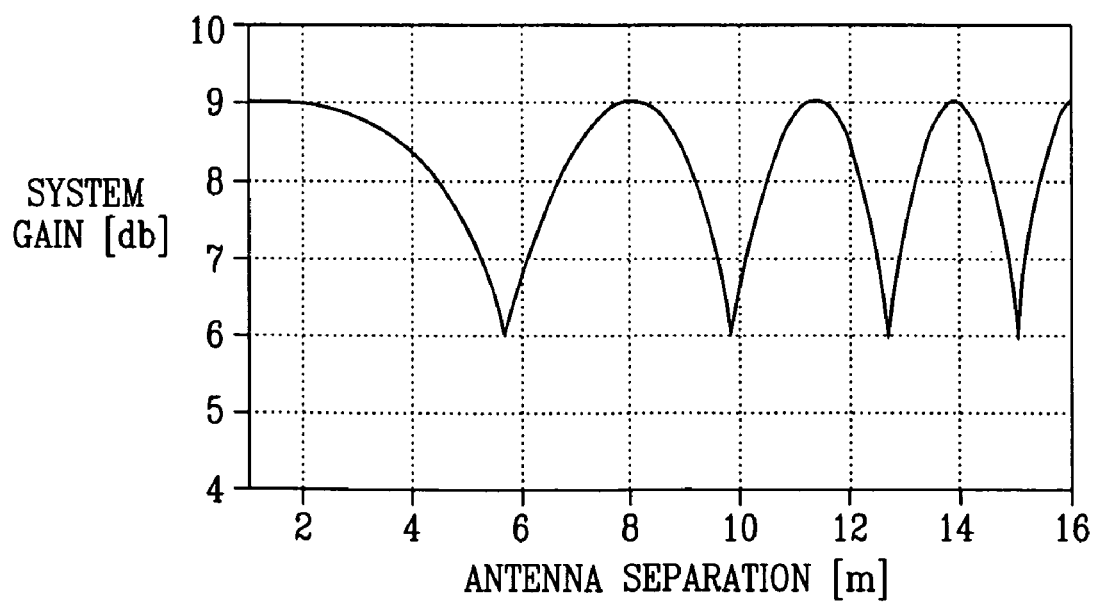
FIG. 6 is a graph showing system gain of a wireless communication link as a function of antenna separation, in accordance with an embodiment of the present invention.

FIG. 6 is a graph showing the system gain of link 20 as a function of antenna separation when the link operates in the beam-forming mode, in accordance with an embodiment of the present invention. In the present example, the link frequency is 23 GHz and the communication range is 5000 m. The transmit antenna separation and the receiver antenna separation are assumed to be the same for the sake of simplicity. In alternative embodiments, the transmitter and receiver may have different antenna separations.

A curve 86 shows the system gain, in dB relative to the system gain provided by a single antenna, as function of the antenna separation. The system gain varies between 6 and 9 dB. In order to achieve the maximum system gain of 9 dB, the phase offset between the RF signals transmitted from antennas 40A and 40B should be controlled so that the resulting directional beam is directed precisely at one of the receive antennas. The phase offset may be determined by a closed loop, which measures the received signals at the receiver and adapts the phase offset at the transmitter accordingly. This closed loop typically uses the reverse channel in order to feed back measurement results and/or corrections to the transmitter. In this configuration, the Local Oscillators (LO) of transmitters 36A and 36B are typically phase-locked to one another, such as by deriving both LOs from a single reference clock.

In an alternative embodiment, the link can be configured to achieve a lower system gain of 6 dB, but such a configuration does not require phase offset coordination or other feedback from the receiver to the transmitter. In these embodiments, the link parameters are set to produce the minimum system gain of 6 dB (in the example of FIG. 6, at an antenna separation of ~5.7 m). At this setting, the system is insensitive to the phase offset between the transmit antennas; therefore the LOs of the two transmitters need not necessarily be phase-synchronized with one another. Time and frequency synchronization are still performed.

In some embodiments, when using LOs that are not phase-synchronized, the dual receiver may compensate for the phase offset between the LOs by multiplying the sample sequences at the outputs of the two receivers by respective, orthogonal phase-rotating signals. For example, the output module may multiply the sample sequence at the output of one receiver (e.g., receiver 52A) by a factor of $Sin(\theta_n)$ and the output of the other receiver (e.g., receiver 52B) by $Cos(\theta_n)$. $\theta_n$ denotes a phase that increments from one sample to the next, which may be produced by a Phase-Locked Loop (PLL) at the dual receiver. The two phase-adjusted signals can then be jointly decoded using Maximum Ration Combining (MRC).

Another transmission scheme that does not require feedback from the receiver to the transmitter is described in the article by Alamouti, cited above. In the method described by Alamouti, the two transmitters transmit signals denoted $S_0$ and $S_1$ in a certain time interval, respectively. In the following interval, the transmitters transmit the signals $-S_1^*$ and $S_0^*$, respectively, wherein the operator ( )* denotes complex conjugation. The two receivers reconstruct $S_0$ and $S_1$ using maximum-likelihood decoding from the signals received over the two intervals. Link 20 may use a similar scheme in the spatial multiplexing operational mode.

Although the embodiments described herein mainly address multi-mode operation of wireless links, the principles of the present invention can also be used for multi-mode operation in other communication systems, such as Synchronous Optical NETwork (SONET) Synchronous Digital Hierarchy (SDH) protected fiber links and Plesiochronous Digital Hierarchy (PDH) protected wireline links.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art.

The invention claimed is:

1. A communication system comprising first and second transmitters, which are coupled to transmit respective first and second Radio Frequency (RF) signals carrying first and second data over a wireless communication channel, to select an operational mode from a group of operational modes and to operate in the selected operational mode, wherein the group of the operational modes comprises at least two of:
   a protection mode, wherein the second transmitter serves as backup to the first transmitter;
   a spatial multiplexing mode, in which the first data is different from the second data, and the first and second transmitters transmit simultaneously; and
   a beam-forming mode, in which the first data is identical to the second data, the second RF signal comprises a phase-shifted replica of the first RF signal, and the first and second transmitters transmit simultaneously, and wherein the system comprises:
   at least one controller, which is configured to evaluate a condition of the system and, responsively to the evaluated condition, to select the operational mode from the group of the operational modes and to cause the first and second transmitters to operate in the selected operational mode;
   first and second receivers, which are coupled to receive the first and second RF signals and to produce first and second received signals; and
   an output module, which is controlled by the at least one controller and is coupled to process the first and second received signals so as to decode at least part of the first and second data in accordance with the selected operational mode.

2. The system according to claim 1, wherein the at least one controller is configured to cause the output module to decode the at least part of the first and second data from one of the first and second received signals when the system is operating in the protection mode, and to jointly decode the first and second data from the first and second received signals when the system is operating in one of the spatial multiplexing and the beam-forming modes.

3. The system according to claim 1, wherein, when the system is operating in the protection mode, both the first receiver and the second receiver are configured to receive the first RF signal, and the second receiver serves as backup to the first receiver.

4. The system according to claim 3, wherein, when the system is operating in the protection mode, the second receiver is inactive, and wherein the at least one controller is configured to activate the second receiver responsively to a failure in the first receiver.

5. The system according to claim 3, wherein, when the system is operating in the protection mode, both the first receiver and the second receiver are active and the output module decodes the first data from the first receiver, and wherein the at least one controller is configured to cause the output module to start decoding the first data from the second receiver responsively to a failure in the first receiver.

6. The system according to claim 1, wherein, when the system is operating in the beam-forming mode, the output module is coupled to jointly decode the first and second data irrespective of a phase offset between the first and second RF signals.

7. The system according to claim 6, wherein the first and second transmitters respectively comprise first and second transmit antennas that are positioned at a first antenna separation with respect to one another, wherein the first and second receivers respectively comprise first and second receive antennas that are positioned at a second antenna separation with respect to one another, and wherein at least one of the first and second antenna separations is chosen such that joint decoding of the first and second data is insensitive to the phase offset.

8. The system according to claim 6, wherein the output module is coupled to multiply the first and second received signals by respective, orthogonal first and second phase-rotating signals before decoding the first and second data.

9. The system according to claim 1, wherein the at least one controller comprises a transmitter controller for controlling the transmitters, and a receiver controller for controlling the receivers and the output module, and wherein the transmitter and receiver controllers are configured to coordinate the selected operational mode with one another.

10. The system according to claim 9, wherein, when the system is operating in the beam-forming operational mode, the receiver controller is configured to perform a measurement on the first and second received signals, and wherein the transmitter controller is configured to modify a phase offset between the first and second RF signals responsively to the measurement.

11. The system according to claim 1, wherein the at least one controller comprises a transmitter controller for controlling the transmitters, and a receiver controller for controlling the receivers and the output module, and wherein the receiver controller is configured to select the operational mode irrespective of the transmitter controller.

12. The system according to claim 1, wherein the at least one controller is configured to alternate between the operational modes without data loss.

13. The system according to claim 1, wherein the condition depends on at least one parameter selected from a group of parameters consisting of a characteristic of a channel between one of the transmitters and one of the receivers, a reception quality at one of the receivers, a failure indication and a characteristic of one of the first and second data.

14. The system according to claim 1, wherein the condition depends on at least one parameter selected from a group of parameters consisting of a modem parameter in one of the transmitters, a modem parameter in one of the receivers, a Signal to Noise Ratio (SNR) of one of the received signals, a dispersion characteristic of a channel between one of the transmitters and one of the receivers, and an error rate in one of the receivers.

15. The system according to claim 1, wherein the at least one controller is configured to select the protection operational mode in order to enable performing a maintenance operation on the system.

16. A communication system comprising first and second transmitters, which are coupled to transmit respective first and second Radio Frequency (RF) signals carrying first and second data over a wireless communication channel, to select an operational mode from a group of operational modes and to operate in the selected operational mode, wherein the group of the operational modes comprises at least two of:
 a protection mode, wherein the second transmitter serves as backup to the first transmitter;
 a spatial multiplexing mode, in which the first data is different from the second data, and the first and second transmitters transmit simultaneously; and
 a beam-forming mode, in which the first data is identical to the second data, the second RF signal comprises a phase-shifted replica of the first RF signal, and the first and second transmitters transmit simultaneously, and
wherein the first and second transmitters are coupled to produce the first and second RF signals using respective first and second Local Oscillator (LO) signals that are phase-synchronized with one another.

17. A communication system comprising first and second transmitters, which are coupled to transmit respective first and second Radio Frequency (RF) signals carrying first and second data over a wireless communication channel, to select an operational mode from a group of operational modes and to operate in the selected operational mode, wherein the group of the operational modes comprises at least two of:
 a protection mode, wherein the second transmitter serves as backup to the first transmitter;
 a spatial multiplexing mode, in which the first data is different from the second data, and the first and second transmitters transmit simultaneously; and
 a beam-forming mode, in which the first data is identical to the second data, the second RF signal comprises a phase-shifted replica of the first RF signal, and the first and second transmitters transmit simultaneously, and
wherein the first and second transmitters are coupled to produce the first and second RF signals using respective first and second Local Oscillator (LO) signals that are not phase-synchronized with one another.

18. The system according to claim 1, wherein the first and second transmitters transmit the first and second RF signals at respective first and second frequencies having first and second phases, and wherein one of the first and second transmitters is coupled to track a frequency and a phase of the other of the first and second transmitters.

19. A method for communication, comprising:
 transmitting first and second Radio Frequency (RF) signals carrying first and second data over a wireless communication channel by respective first and second transmitters;
 evaluating a system condition and, responsively to the evaluated condition, selecting an operational mode from a group of operational modes and causing the first and second transmitters to operate in the selected operational mode, wherein the group of the operation modes comprises at least two of:
  a protection mode, wherein the second transmitter serves as backup to the first transmitter;
  a spatial multiplexing mode, in which the first data is different from the second data, and the first and second transmitters transmit simultaneously; and
  a beam-forming mode, in which the first data is identical to the second data, the second RF signal comprises a phase-shifted replica of the first RF signal, and the first and second transmitters transmit simultaneously;
 receiving the first and second RF signals using respective first and second receivers, to produce first and second received signals; and
 processing the first and second received signals so as to decode at least part of the first and second data in accordance with the selected operational mode.

20. The method according to claim 19, wherein processing the received signals comprises decoding the at least part of the first and second data from one of the first and second received signals when the selected operational mode comprises the protection mode, and jointly decoding the first and second data from the first and second received signals when the selected operational mode comprises one of the spatial multiplexing and the beam-forming modes.

21. The method according to claim 19, wherein, when the selected operational mode comprises the protection mode, receiving the RF signals comprises receiving the first RF signal by both the first receiver and the second receiver, such that the second receiver serves as backup to the first receiver.

22. The method according to claim 21, wherein, when the when the selected operational mode comprises the protection mode, receiving the RF signals comprises deactivating the second receiver, and activating the second receiver responsively to a failure in the first receiver.

23. The method according to claim 21, wherein, when the selected operational mode comprises the protection mode, receiving the RF signals comprises activating both the first receiver and the second receiver and decoding the first data from the first receiver, and beginning to decode the first data from the second receiver responsively to a failure in the first receiver.

24. The method according to claim 19, wherein, when the selected operational mode comprises the beam-forming mode, processing the received signals comprises jointly decoding the first and second data irrespective of a phase offset between the first and second RF signals.

25. The method according to claim 24, wherein the first and second transmitters respectively include first and second transmit antennas that are positioned at a first antenna separation with respect to one another, wherein the first and second receivers respectively include first and second receive antennas that are positioned at a second antenna separation with respect to one another, and wherein at least one of the first and second antenna separations is chosen such that joint decoding of the first and second data is insensitive to the phase offset.

26. The method according to claim 24, wherein processing the received signals comprises multiplying the first and second received signals by respective, orthogonal first and second phase-rotating signals before decoding the first and second data.

27. The method according to claim 19, wherein selecting the operational mode comprises coordinating the selected operational mode among the transmitters and the receivers.

28. The method according to claim 19, wherein, when the selected operational mode comprises the beam-forming mode, processing the received signals comprises performing a measurement on the first and second received signals, and wherein transmitting the first and second RF signals comprises modifying a phase offset between the first and second RF signals responsively to the measurement.

29. The method according to claim 19, wherein selecting the operational mode comprises selecting the mode by the receivers irrespective of the transmitters.

30. The method according to claim 19, wherein selecting the operational mode comprises alternating between the operational modes without data loss.

31. The method according to claim 19, wherein the system condition depends on at least one parameter selected from a group of parameters consisting of a characteristic of a channel between one of the transmitters and one of the receivers, a reception quality at one of the receivers, a failure indication and a characteristic of one of the first and second data.

32. The method according to claim 19, wherein the system condition depends on at least one parameter selected from a group of parameters consisting of a modem parameter in one of the transmitters, a modem parameter in one of the receivers, a Signal to Noise Ratio (SNR) of one of the received signals, a dispersion characteristic of a channel between one of the transmitters and one of the receivers, and an error rate in one of the receivers.

33. The method according to claim 19, wherein selecting the protection operational mode comprises selecting the mode in order to enable performing a maintenance operation.

34. A method for communication, comprising:
transmitting first and second Radio Frequency (RF) signals carrying first and second data over a wireless communication channel by respective first and second transmitters; and
selecting an operational mode from a group of operational modes and causing the first and second transmitters to operate in the selected operational mode, wherein the group of the operation modes comprises at least two of:
a protection mode, wherein the second transmitter serves as backup to the first transmitter;
a spatial multiplexing mode, in which the first data is different from the second data, and the first and second transmitters transmit simultaneously; and
a beam-forming mode, in which the first data is identical to the second data, the second RF signal comprises a phase-shifted replica of the first RF signal, and the first and second transmitters transmit simultaneously,
wherein transmitting the first and second RF signals comprises producing the RF signals using respective first and second Local Oscillator (LO) signals that are phase-synchronized with one another.

35. A method for communication, comprising:
transmitting first and second Radio Frequency (RF) signals carrying first and second data over a wireless communication channel by respective first and second transmitters; and
selecting an operational mode from a group of operational modes and causing the first and second transmitters to operate in the selected operational mode, wherein the group of the operation modes comprises at least two of:
a protection mode, wherein the second transmitter serves as backup to the first transmitter;
a spatial multiplexing mode, in which the first data is different from the second data, and the first and second transmitters transmit simultaneously; and
a beam-forming mode, in which the first data is identical to the second data, the second RF signal comprises a phase-shifted replica of the first RF signal, and the first and second transmitters transmit simultaneously,
wherein transmitting the first and second RF signals comprises producing the RF signals using respective first and second Local Oscillator (LO) signals that are not phase-synchronized with one another.

36. The method according to claim 19, wherein transmitting the first and second RF signals comprises transmitting the RF signals at respective first and second frequencies having first and second phases, and tracking a frequency and a phase of one of the first and second transmitters by the other of the first and second transmitters.

* * * * *

UNITED STATES PATENT AND TRADEMARK OFFICE
CERTIFICATE OF CORRECTION

PATENT NO.       : 8,126,408 B2
APPLICATION NO.  : 12/009728
DATED            : February 28, 2012
INVENTOR(S)      : Aharony et al.

It is certified that error appears in the above-identified patent and that said Letters Patent is hereby corrected as shown below:

Title Page
Item (12) and Item (75), please replace "Ahrony" with --Aharony--.

Title Page
Item (75), please replace "Ragfi" with --Rafi--.

Column 14
Line 53, Claim 22, please remove "when the".

Signed and Sealed this
Thirtieth Day of October, 2012

David J. Kappos
*Director of the United States Patent and Trademark Office*